3,152,959
INJECTION METHOD AND APPARATUS FOR
CONTROLLED FUSION DEVICES
Charles C. Damm, Alamo, Calif., assignor to the United
States of America as represented by the United States
Atomic Energy Commission
Filed June 6, 1962, Ser. No. 200,586
13 Claims. (Cl. 176—1)

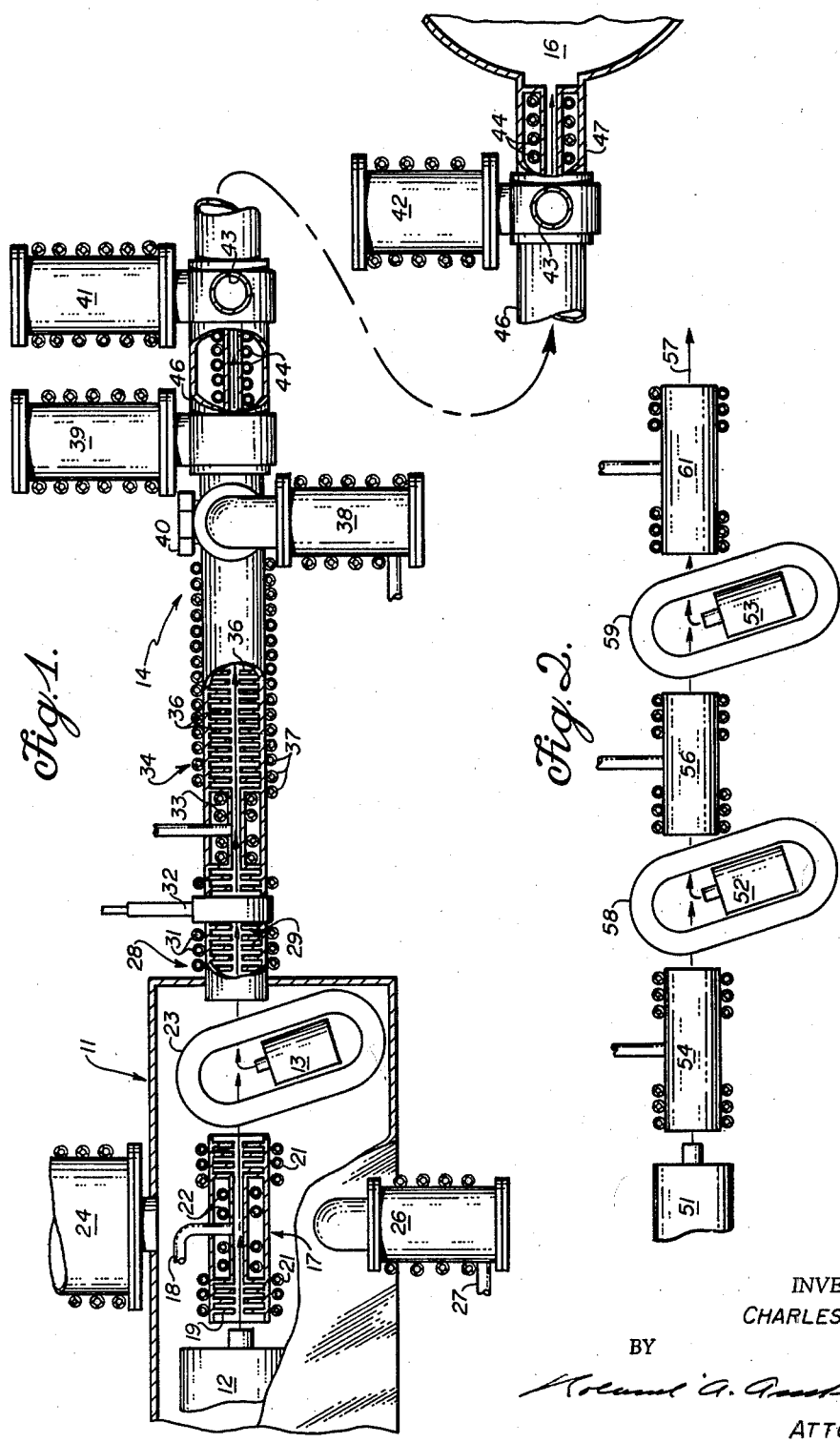

The present invention relates to particle injection into controlled fusion devices and, more particularly, to a method and apparatus for introducing a plurality of neutral particle beams into a controlled fusion device.

It is extremely difficult to introduce well collimated beams of ions into controlled fusion devices for the formation of hot plasmas. This difficulty exists partially because of the mutual ionic repulsion and attraction in the beam, i.e., space charge blowup, and the action of magnetic fields on the ions within the beams. In addition, difficulty has also been encountered in trying to properly shield the ionic beam from the high magnetic field of the reactor before the beam reaches the confinement volume of a controlled fusion device.

The art has therefore generally turned to the injection of energetic neutral particles, i.e., atoms and molecules, into controlled fusion devices. Because of their neutrality, atoms or molecules are not affected by magnetic fields nor are they subject to space charge blowup. After injection into the confinement volume of a fusion device, neutral particles are ionized or trapped by impinging on the few residual gas particles still remaining within a confinement volume after it has been evacuated to a high or an ultra high vacuum, e.g., $10^{-9}$ mm. Hg. As the neutral particles are trapped, the newly formed ions are able to, in turn, trap more of the incoming neutral particles. In this manner, the requisite ions are produced for the formation of the fusion plasma. A more detailed and theoretical analysis of neutral beam injection is presented in the paper entitled "Injection Into Thermonuclear Machines Using Beams of Neutral Deuterium Atoms in the range 100 kev. to 1 mev.," by G. Gibson et al., Proceedings of the Second United Nations International Conference on the Peaceful Uses of Atomic Energy, Geneva, 1958, volume 32.

As indicated in this paper, it is very difficult to start the trapping of deuterium atoms or other relatively heavy neutral particles. The stringent vacuum requirements or, alternately, the required high beam energies are beyond present technical capabilities.

For example, to be effectively trapped, a 100 kev. beam of deuterium atoms would have to have a density of at least 0.15 (ampere equivalent) and be introduced into a confinement volume evacuated to at least $1.3 \times 10^{-10}$ mm. Hg. If it is desired to use a less stringently evacuated confinement volume, the beam energy or density must necessarily go up.

The present invention provides an injection method and apparatus capable of reducing these problems by making it possible to introduce a plurality of beams into the confinement volume of a controlled fusion device. In general the invention resides in providing a plurality of ion beams, aligning these ion beams with a single entrance port into the confinement volume by passing them through suitable force fields, neutralizing these ion beams whereby the resultant neutral particle beams enter through the entrance port into the confinement volume.

It has been found that a beam of hydrogen atoms, because of hydrogen's lower weight and low charge exchange cross section, is more easily trapped by a residual gas than the commonly used plasma fusion gases, e.g., deuterium, tritium, and helium. It is only necessary that a hydrogen beam may be of an energy of 20 kev. and a density of 0.10 (ampere equivalent) for it to be substantially ionized in a confinement volume evacuated to $10^{-9}$ mm. Hg. Hydrogen ions, i.e., protons, in turn, easily ionize beams of the above-mentioned commonly used gases. This may be understood by considering, for example, deuterium atoms impinging on just the residual neutral gas in a confinement volume. Neglecting the very few ionic collisions, we have the reaction $$D°+X \rightarrow D^++X+e$$

where X represents an atom or molecule of the residual gas. Many of the deuterons thus formed reunite with electrons captured from gas molecules because of deuterium's relatively large charge exchange cross section, thus reducing the total number of ions in the plasma.

However, if the beam of deuterium atoms is introduced immediately after or with a beam of hydrogen atoms, the hydrogen atoms quickly ionize and we have the additional reaction of deuterium with relatively heavy hydrogen ions of $D°+H^+ \rightarrow D^++H^++e$ and also the reaction $D°+e \rightarrow D^++2e$. Because of these additional reactions, the hot deuteron plasma buildup is greatly facilitated.

To introduce a hydrogen "starter" beam, it would appear obvious to just provide an additional entrance port into the confinement volume and inject the beam by conventional methods. However, unwanted gas leakage into the confinement volume increases markedly and directly with the number of such injection ports. The excess gas could cause the loss of all trapped plasma within the fusion device or, at the very least, require a much more efficient and complex vacuum system than is presently available.

Since the present invention is a means of introducing a plurality of neutral beams into a confinement volume through a single entrance port, it can be easily seen that it provides a method of introducing a hydrogen starter beam. Using the method of the present invention the hydrogen and fuel beams could be either introduced individually or intermixed into one beam. In the preferred embodiment, which is described infra, the beams are intermixed, and although the beam proportions are not critical, a composite beam of 90% hydrogen atoms or molecules and 10% of the fuel atoms is used. Because of its low cost and availability, deuterium is used as the fuel. Using the above proportions and deuterium as the fuel, a 100 kev. deuterium beam need only have a a density of .01 ampere equivalent and be mixed with a hydrogen beam of 0.1 density and an energy of 20 kev. to effectively create a hot deuteron plasma in a vacuum of $10^{-9}$ mm. Hg.

The present invention has many other uses and advantages. Two or more beams of neutral particles may be intermixed to increase the total beam density entering the confinement volume thus facilitating the starting and building of the plasma and allowing an increase in the total amount of fuel within the confinement volume. The introduction of beams having different energies, which has a stabilizing effect on a plasma, is also possible with the present invention. It may also be used in diagnostics. A probe beam of helium, for example, may be introduced into a confinement volume in order to determine the condition of a hot plasma confined therein.

It is therefore an object of the present invention to provide a method and apparatus for multiple atomic beam injection into a controlled fusion device.

Another object of the present invention is to provide a method and apparatus for easily trapping a beam of neutral particles in a controlled fusion device.

It is a further object of the present invention to provide a method and apparatus for introducing a plurality of neutral beams of several different kinds into a controlled fusion device.

Still another object of the present invention is to provide a method and apparatus for introducing a plurality of neutral beams of varying energies into a controlled fusion device.

One other object of the present invention is to provide a method and apparatus for intermixing a plurality of particle beams for introduction into the confinement volume of a controlled fusion device.

A still further object of the present invention is to provide a method and apparatus for introducing a probe beam into a controlled fusion device.

Other objects and uses of the present invention will be apparent to those skilled in the art upon consideration of the following description of the invention with reference to the attached drawing in which:

FIGURE 1 is a plan view, partially cut away, of a preferred embodiment of an apparatus for introducing two beams into the confinement volume of a controlled fusion device; and FIGURE 2 is a schematic presentation showing apparatus for introducing more than two beams into a controlled fusion device.

Referring now to FIGURE 1, there is shown a hermetically sealed enclosure 11 housing two ion sources 12 and 13. Ion source 12 is coaxially aligned with a hermetic beam tube 14 leading from the enclosure 11 to the confinement volume 16 (partially shown) of a controlled fusion device. Also aligned with beam tube 14 is a neutralizer 17 positioned within the enclosure 11 between the two ion sources. This neutralizer 17 is of the gas target type. An incoming ion beam loses its charge by picking up electrons from gas atoms or molecules in the neutralizer. Any suitable gas may be used in the neutralizer, e.g., hydrogen, helium or nitrogen, but it is preferred that a condensible gas, for instance water vapor, be used in this embodiment. An inlet 18 is provided on the neutralizer for the introduction of this gas. Baffles 19 cooled by the passage of liquid nitrogen through coils 21 condenses any target gas incident thereon and thus prevent the gas from escaping from the neutralizer. Coils 22 having a liquid maintained at a constant temperature passing therethrough surround the neutralizer passageway to ensure a constant target gas temperature.

Ion source 13 is positioned out of the line of sight through the beam tube, off-axis at an angle of 90° or greater, preferably at about 110°. An air core electromagnet 23 is positioned about the source 13 to provide a force field to align the ion beam emitted from source 13 with the beam tube 14.

Communicating with the enclosure 11 is an evacuation system including a titanium gettering pump 24, and a 6 inch diffusion pump 26 extending outward from the enclosure. A conventional fore-pressure pump (not shown) communicates with the pump 26 through pipe 27. A similiar 6 inch diffusion pump (not shown) and fore-pressure pump (also not shown) are provided communicating with the other side of the enclosure 11.

The beam tube 14 includes coaxially a magnetically shielded introduction pipe 28 having baffles 29 cooled by liquid nitrogen coils 31 to prevent gas backstreaming towards the ion sources, and a conventional vacuum valve 32 to permit isolation of the enclosure 11 from the remainder of the system. Another neutralizer 33 similiar to neutralizer 17 is coaxially connected to the vacuum valve 32. A further gas condensing pipe 34 with baffles 36 cooled by liquid nitrogen coils 37 is provided next in the beam tube. An evacuation system including two six inch diffusion pumps, one on each side of the beam tube and one 38 of which can be seen, two titanium gettering pumps 39 and 41, and a molybdenum gettering pump 42 communicate with the beam tube near the confinement volume. Diffusion pumps (not shown) are associated with gettering pumps 41 and 42 and communicate with the beam tube 11 by ports 43. An air core electromagnet 40 is situated above the beam tube 11 near diffusion pump 38. Liquid nitrogen coolant coils 44 surround the beam tube pipes 46 connecting the various pumps and also pipe 47 from pump 42 to the reactor confinement volume 16. The confinement volume is itself usually a vacuum pump, e.g., a molybdenum gettering pump, so that the high vacuum necessary for controlled fusion may be reached.

In the operation of the apparatus of FIGURE 1 for performing the process of the present invention, the entire system is first evacuated by the various pumps. Preferably, the pressure in the enclosure 11 should be reduced to about $10^{-4}$ mm. Hg. The pressure across the valve 32 and the neutralizer 33 should be reduced to about $10^{-3}$ mm. Hg. The diffusion pump 38 creates a pressure differential along the length of the gas condensing pipe 34 and it is preferred that the pressure at the pump end of the pipe 34 be reduced to about $2\times 10^{-5}$ mm. Hg. The gettering pumps and their associated diffusion pumps make it possible to further reduce the pressure in the beam tube to about $10^{-8}$ mm. Hg. at the entrance port to the confinement volume 16. Because the confinement volume itself is a pump, the ultimate vacuum in the confinement volume may be reduced to at least $10^{-8}$ mm. Hg., but preferably to about $10^{-9}$ mm. Hg.

After the above pressures are reached, the system is ready for the beam injection. If the invention is to be used to provide a hydrogen starter beam, it is preferred that ion source 12 be a deuteron source capable of emitting a beam of 0.1 amp density having an energy of 100 kev., and that ion source 13 be capable of emitting a hydrogen beam of .5 amp density having an energy of 20 kev. Both of these ion sources and the magnet 23 are activated. The deuterons from source 12 pass through the neutralizer 17 where approximately 52% of the ions are neutralized. The neutral deuterium atoms pass through the field caused by the magnet 23 and into the beam tube 14. In keeping with the invention, hydrogen ions from source 13 are acted upon by the magnetic field. When, as preferred, the ion source 13 is off-axis at a 110° angle, the field strength should be 2300 gauss in order for the ions to enter the beam tube intermixed with the deuterium beam. Because the source 13 is 110° off-axis, the beam as it enters the beam tube is slightly convergent. If the ion source was at a less than 90° angle, the beam would be divergent and the desired collimation would not be attained.

The intermixed beam of deuterium and hydrogen ions travels through the magnetically shielded pipe 28 and the open vacuum valve 32 into the neutralizer 33. Within this neutralizer the major portion of the hydrogen beam is neutralized and a composite beam of hydrogen, deuterium, a few remaining charged particles, and water vapor enters the gas condensing pipe 34. The cold baffles 36 condense the water vapor out of the beam, and, while stray magnetic fields and the very strong magnetic field of the reactor would remove the charged particles from the beam, magnet 40 is provided to remove them all at one time and place. Thus we have the desired intermixed beam of hydrogen and deuterium atoms entering the thermonuclear confinement volume.

By referring now to FIGURE 2, it can easily be seen that any number of off-axis sources and neutralizers may be used. Hence if it is desired to increase the total teuterium beam, source 51 and off-axis source 52 could both be deuterium sources while the source 53 could be used to introduce the hydrogen starter beam. Or, if it is desired, one of the sources could be used to furnish a probe beam to be introduced into a confinement volume after the formation of a plasma. It should be noted that neutralizers 54 and 56 are necessarily placed between each pair of ion sources in order to insure that the main beam 57 is neutral when crossing the several fields created by magnets 58 and 59. However, if it is desired to intermix an ion beam with the neutral beam, the last neutralizer 61 need not be provided. It should also be noted that a coaxial source such as source 51 need not provided; it is only preferred that one of the desired number of sources be coaxial for economic reasons.

While for ease in understanding the present invention, it has been described with reference to a preferred embodiment, it should be understood that many variations of the invention will be apparent to those skilled in the art and hence the scope of the invention is only intended to be limited by the following claims.

What is claimed is:

1. A method of injecting a plurality of neutral particle beams through a single entrance port into the confinement volume of a controlled fusion device comprising the steps of reducing the pressure in said confinement volume to about $10^{-9}$ mm. Hg, activating a series of ion beam sources positioned off-axis of said entrance port at an angle of 90° or greater, passing each beam from said sources through a force field associated with each of said sources and predetermined to align each of said beams with each entrance port, and thereafter neutralizing the particles of each beam whereby further force fields do not prevent each of said beams from entering through said entrance port into said confinement volume.

2. The method of claim 1 wherein said predetermined force fields acting on each beam are magnetic fields.

3. The method of claim 1 wherein said plurality of beams are intermixed and coaxially aligned with said entrance port.

4. The method of claim 3 comprising the additional steps of activating an ion beam source coaxially aligned with said entrance port, and thereafter neutralizing the particles of the beam from said source.

5. A method of injecting a plurality of neutral particle beams through a single entrance port into the confinement volume of a controlled fusion device comprising the steps of reducing the pressure in said confinement volume to at least $10^{-8}$ mm. Hg, activating a first ion beam source coaxially aligned with said entrance port, passing the ion beam from said first source through a gas neutralizer aligned coaxially with said entrance port, activating a second ion beam source positioned off-axis of said entrance port, at an angle of 90° or greater, passing the beam from said second source through a magnetic field of a predetermined strength and direction to coaxially align and intermix said first beam and said second ion beam, and thereafter passing the resultant intermixed beam through a gas neutralizer coaxially aligned with said entrance port to neutralize the ions from said second beam.

6. The method of claim 5 wherein said second source is off-axis at an angle of 110°.

7. Apparatus for the injection of a plurality of neutral beams into the confinement volume of a controlled fusion device comprising a first ion beam source coaxially aligned with an entrance port into said confinement volume, a first beam neutralizer coaxially aligned with said entrance port between said first source and said entrance port, a second ion beam source positioned off-axis of said entrance port at an angle of 90° or greater and between said first neutralizer and said entrance port, force field means associated with said second source to coaxially align the beam from said second source with said entrance port, and a second neutralizer coaxially aligned with said entrance port between said second source and said entrance port.

8. The apparatus of claim 7 in which said second ion beam source is off-axis of said entrance port at an angle of 110°.

9. Apparatus for the injection of a plurality of neutral beams into the confinement volume of a controlled fusion device comprising a hermetically sealed enclosure having an outlet coaxially aligned with an entrance port into said confinement volume, a first ion beam source within said enclosure and coaxially aligned with said outlet and said entrance port, a first beam neutralizer within said enclosure and coaxially aligned with first source between said first source and said outlet, a second ion beam source within said enclosure and positioned off-axis of said outlet at an angle of 110°, an air-core electromagnet associated with said second source to coaxially align the beam from said second source with said outlet and said entrance port, a magnetically shielded beam tube hermetically connecting said outlet of said enclosure with said entrance port into said confinement volume, said beam tube including coaxially; a vacuum valve, a second beam neutralizer, a gas condensing pipe having baffles cooled by liquid nitrogen coils and positioned between said second neutralizer and said entrance port; an evacuation system communicating with said enclosure and said beam tube capable of reducing the pressure in said enclosure to about $10^{-4}$ mm. Hg and the pressure at the entrance port end of said beam tube to about $10^{-8}$ mm. Hg, and means for producing a force field between said second neutralizer and said entrance port.

10. A method of forming a hot nuclear fusion plasma comprising the steps of establishing a magnetic field defining a charged particle confinement volume in a region evacuated to provide a low concentration of residual gas particles therein, introducing a starter beam of neutral hydrogen particles into said magnetic field to interact with said residual gas particles and be ionized and trapped in said containment zone, and thereafter introducing a beam of neutral fusion gas particles, said fusion gas selected from the group consisting of the atoms and molecules of deuterium, tritium, and helium, into said zone to interact with said ionized hydrogen particles and be ionized and trapped in said confinement zone to form said hot fusion plasma.

11. A method of forming a hot nuclear fusion plasma comprising the steps of reducing the pressure in a controlled fusion device to at least $10^{-8}$ mm. Hg, establishing a magnetic field defining a charged particle confinement volume within said controlled fusion device, and thereafter introducing an intermixed beam comprising a starter beam of neutral hydrogen particles and a beam of neutral fusion gas particles, said fusion gas selected from the group consisting of the atoms and molecules of deuterium, tritium, and helium, into said confinement volume to interact with said residual gas molecules and be ionized and trapped in said confinement volume to form said hot nuclear fusion plasma.

12. A method of forming a hot fusion gas plasma according to claim 11 wherein said neutral fusion gas particles are deuterium particles and said intermixed beam is 90% hydrogen particles and 10% deuterium particles.

13. A method of forming a hot fusion gas plasma according to claim 12 wherein said intermixed beam comprises a .1 ampere equivalent density beam of hydrogen atoms having an energy of 20 kev., and a .01 ampere equivalent density beam of deuterium atoms having an energy of 100 kev.

References Cited in the file of this patent

UNITED STATES PATENTS

| | | |
|---|---|---|
| 2,997,431 | Bell et al. | Aug. 22, 1961 |
| 3,005,931 | Dandl | Oct. 24, 1961 |
| 3,075,115 | Flowers et al. | Jan. 22, 1963 |

FOREIGN PATENTS

| | | |
|---|---|---|
| 878,337 | Great Britain | Sept. 27, 1961 |

OTHER REFERENCES

Proceedings of the Second United Nations Int. Conf. on the Peaceful Uses of Atomic Energy, United Nations, vol. 32, (1958) (an article by Gibson et al.), pp. 275–278.